United States Patent
Hintennach et al.

(10) Patent No.: US 8,162,370 B2
(45) Date of Patent: Apr. 24, 2012

(54) PROTECTION DEVICE FOR A VEHICLE INTERIOR

(75) Inventors: Markus Hintennach, Reichenbach (DE); Thomas Schleef, Porta Westfalica (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/927,921

(22) Filed: Nov. 30, 2010

(65) Prior Publication Data

US 2011/0133507 A1    Jun. 9, 2011

(30) Foreign Application Priority Data

Dec. 3, 2009    (DE) .................. 10 2009 058 293

(51) Int. Cl.
*B60J 7/00*    (2006.01)

(52) U.S. Cl. .................................... 296/37.16

(58) Field of Classification Search ............... 296/37.16
See application file for complete search history.

(56) References Cited

U.S. PATENT DOCUMENTS 6,773,046 B2 *   8/2004   Nakamitsu et al. ........ 296/37.16

FOREIGN PATENT DOCUMENTS

| DE | 196 37 072 C1 | 10/1997 |
| DE | 10 2009 036 606 B3 | 8/2010 |
| EP | 2 072 327 A1 | 6/2009 |

OTHER PUBLICATIONS

European Patent Office Search Report dated Apr. 11, 2011 (6 pages) with English language translation of the categories of the documents.

* cited by examiner

*Primary Examiner* — Joseph Pape
(74) *Attorney, Agent, or Firm* — Flynn, Thiel, Boutell & Tanis, P.C.

(57) ABSTRACT

A protection device of this type includes a flexible sheetlike structure which is mounted movably between a compactly stored inoperative position and at least one at least partially extended functional position and is provided at the end thereof which is in front in the extension direction with a planar and dimensionally stable contour part which extends substantially over an entire width of the sheetlike structure.

Control kinematics are assigned to a movement end region of the contour part shortly before the extended end position is reached, the control kinematics shifting the contour part forwards in the extension direction by an additional extension distance.

19 Claims, 3 Drawing Sheets

PROTECTION DEVICE FOR A VEHICLE INTERIOR

FIELD OF THE INVENTION

The invention relates to a protection device for a vehicle interior, with a sheetlike structure which is mounted movably between a compactly stored inoperative position and at least one at least partially extended functional position and is provided at the end thereof which is in front in the extension direction with a planar and dimensionally stable contour part which extends substantially over an entire width of the sheetlike structure.

BACKGROUND OF THE INVENTION

A protection device in the form of a loading space covering is known from DE 196 37 072 C1. The known loading space covering has a sheetlike structure which is mounted in a manner such that it can be wound up and unwound on a winding shaft and is provided at the end thereof which is in front in the extension direction with a dimensionally stable contour part. The contour part is assigned a supporting arm arrangement which constitutes an elongation for the contour part. By means of the supporting arm arrangement, which protrudes forwards in the winding-up direction relative to the contour part, the contour part can be fixed in the extended end position in holders on the vehicle, wherein the contour part is inevitably shifted further to the rear into a rear region within the loading space because of the elongation. The supporting arm arrangement is arranged rigidly on the contour part and remains on the contour part even in the retracted, i.e. wound-up, inoperative position of the sheetlike structure.

SUMMARY OF THE INVENTION

It is the object of the invention to provide a protection device of the type mentioned at the beginning which, without a specified supporting arm arrangement, permits an additional shifting of the contour part shortly before the extended end position is reached.

This object is achieved in that control means are assigned to a movement end region of the contour part shortly before the extended end position is reached, said control means shifting the contour part forwards in the extension direction by an additional extension distance. The solution according to the invention is suitable for protection devices in the form of horizontally extendable loading space coverings and for separating devices between the loading space and passenger compartment, and for protection devices which are suitable for shading transparent roof surface regions, side windows or rear windows of a motor vehicle. The control means according to the invention act on the contour part shortly before the extended end position of the contour part is reached in order to shift said contour part over the additional extension distance. The flexible sheetlike structure is dimensioned in such a manner that it can follow the additional extension distance of the contour part. The control means are provided on the vehicle and transfer the contour part over the length of the additional extension distance into the completely extended end position. It is possible by means of the solution according to the invention to shorten the contour part in relation to known contour parts which do not carry out an additional extension distance. As a result, the contour part has a low weight. The contour part serves to cover a space remaining between the adjacent end border of the sheetlike structure in the extended functional position and a vehicle interior boundary surface. In the case of a horizontal loading space covering, the contour part serves to span a clearance in a rear region of the loading space as far as an inner contour of a tailgate.

In a refinement of the invention, the control means comprise control kinetics acting mechanically on the contour part and transferring the contour part into the end position. The control kinetics is provided on the vehicle. If the protection device is configured as a horizontally extendable loading space covering, the control kinetics is distributed on opposite sides of the vehicle in order to be able to guide the contour part in a synchronized and parallel manner from opposite sides.

In a further refinement of the invention, the control kinetics is configured in such a manner that the contour part is transferred into the end position by a pivoting or curved movement. The pivoting or curved movement preferably runs away obliquely upwards or downwards from the normal extension direction in order to obtain a desired shifting of the contour part. The control kinetics is provided only in an end region of an extension movement of the sheetlike structure and of the contour part. The control kinetics can adjoin lateral guide rails which, on opposite sides, flank the extension movement of the sheetlike structure and of the contour part out of the inoperative position thereof and are arranged on the vehicle. As an alternative, the control kinetics can be provided in the abovementioned end region without the extension distance or return distance of the sheetlike structure and of the contour part between the inoperative position and the virtually extended end position being flanked by means of lateral guides. In this variant, the sheetlike structure and the contour part can either be extended manually by hand and subsequently passed over to the control kinetics, or there is pivoting lever kinetics which extends the contour part in a manner analogous to known pivoting lever kinetics in a rear window roller blind, and pass the contour part over to the control kinetics shortly before the end position is reached. Of course, the pivoting lever kinetics is then released from the contour part.

In a further refinement of the invention, the contour part is guided over the entire extension distance thereof via guide means which are on the vehicle and which are assigned the control kinetics in the end region of the extension distance. In an advantageous manner, the contour part is held in the region of the opposite ends thereof on a respective slide which is mounted movably in each case in a guide rail arrangement on the vehicle. The guide rail arrangements and the slides mounted in the guide rail arrangements constitute guide means within the meaning of the invention.

In a further refinement of the invention, an end region of the guide rail arrangement is assigned a control slot which is inclined relative to the guide rail arrangement in such a manner that the contour part is tilted forwards in the extension direction upon reaching the control slot. The control slot continues the guide rail arrangement such that the slide is transferred from the guide rail arrangement into the control slot as soon as the contour part and the sheetlike structure have passed through a corresponding extension distance.

In a further refinement of the invention, the contour part is held on a respective slide by means of a pivoting arm, the pivoting arm being mounted pivotably on the slide about a pivot axis extended transversely with respect to the extension direction, and a restraint is provided level with the end region of the guide rail arrangement, said restraint transferring the pivoting arm when the slide reaches the end region into a pivoted position which is shifted forwards in the extension direction. Instead of a slotted guide into which the slide enters after running through the guide rail arrangement, in this refinement, the contour part is held on the slide by means of a pivoting arm on each side. Each pivoting arm is held in an upright position on the respective slide during the time in which the contour part is shifted from the inoperative position via the normal extension distance into a substantially extended functional position. Only when the pivoting arm reaches the restraint mounted on the vehicle is it pivoted forwards in the extension direction, as a result of which the contour part held at the two pivoting arms is pivoted forwards in the extension direction. Opposite side borders of the sheetlike structure preferably protrude freely to corresponding boundary surfaces of the vehicle interior such that the side borders of the sheetlike structure do not come to rest on or collide with corresponding interior boundary surfaces during a pivoting movement of the pivoting arm and of the contour part.

In a further refinement of the invention, the contour part is accommodated by the opposite end regions thereof in corresponding receptacles of each slide in a form-fitting manner such that the contour part is positioned in a rotationally fixed manner in the receptacles. During a shifting of the receptacle of each slide, the orientation of the contour part relative to said receptacles is therefore inevitably maintained at the same angle.

Another aspect of the present invention is to provide a protection device for a vehicle interior. The protection device comprises a flexible sheetlike structure which is mounted movably between a compactly stored inoperative position and a fully extended position, a planar and dimensionally stable contour part disposed at an end of the flexible sheetlike structure and extending substantially over an entire width of the sheetlike structure, and a track system for moving the flexible sheetlike structure between the compactly stored inoperative position and the fully extended position, the track system forcing the contour part to shift forward an additional extension distance before the fully extended position is reached.

Further advantages and features of the invention emerge from the Claims and from the description below of preferred exemplary embodiments of the invention, which are illustrated with reference to the drawings.

DETAILED DESCRIPTION OF EMBODIMENTS OF THE INVENTION

Figure 1:
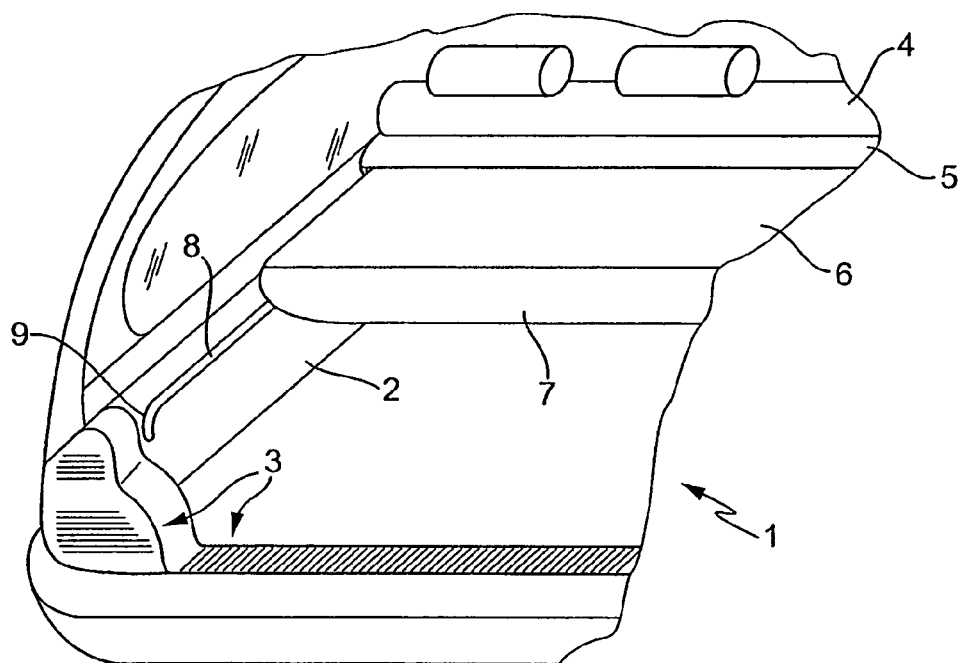
FIG. 1 shows, schematically in a perspective illustration, an embodiment of a protection device according to the invention for a vehicle interior of an estate vehicle.

According to FIG. 1, a motor vehicle in the form of an estate vehicle has a loading space 1 which is bounded on the opposite sides of the vehicle by two loading space side walls 2. Towards a vehicle rear, the loading space 1 ends at a rear region 3 with a tailgate opening which can be closed by a tailgate (not illustrated). The loading space 1 is bounded forwards in the direction of travel by a backrest arrangement 4 of a rear seat bench. A loading space covering 5 to 7 is positioned directly behind the backrest arrangement 4. The loading space covering 5 to 7 has a cassette housing 5 which extends parallel to the backrest arrangement 4 over the width of the loading space 1 and is held at the opposite end regions thereof in a manner mounted on the vehicle on the loading space side walls 2. A winding shaft 10 is mounted rotatably in the cassette housing 5, and a flexible sheetlike structure 6, preferably in the form of a covering tarpaulin, is held on the winding shaft in a manner such that it can be wound up and unwound. A dimensionally stable contour part 7 is fastened to an end region, which is in front in the extension direction, of the flexible sheetlike structure 6, said contour part, in the extended functional state of the flexible sheetlike structure 6, covering a clearance, which remains in the rear region 3, between an end edge of the flexible sheetlike structure 6 and an inner contour of the tailgate.

The contour part 7 and the flexible sheetlike structure 6 are guided over the entire extension movement and return movement thereof by means of guide means 8, 9, 11. In the region of the opposite side end regions thereof, the contour part 7 has a respective retaining section 13 which is of polygonal, preferably tetragonal, configuration and cross section. Each retaining section 13 is retained in a U-shaped receiving support 12 of a guide slide 11. The guide slide 11 is mounted in a rollable manner in a guide rail arrangement 8 mounted on the vehicle in the region of each loading space side wall. The guide rail arrangement 8 is arranged at a distance below an extension plane of the flexible sheetlike structure 6. The guide slide 11 has a support foot (not denoted specifically) on which the respective receiving support 12 is fastened. Respectively identical guide rail arrangements 8 and guide slides 11 are provided in the region of the opposite loading space side walls 2 and are designed in a mirror-symmetrical manner with respect to a vertical center longitudinal plane of the vehicle. The contour part 7 is therefore inserted by the two opposite side end regions thereof and the corresponding retaining sections 13 into the opposite receiving supports 12 of the opposite guide slides 11. The U-shaped receptacle of the receiving support 12 and the cross-sectional profile of each retaining section 13 are matched in a form-fitting manner to each other such that the retaining sections 13 in the associated receiving supports 12 engage in each other in a rotationally fixed manner relative to a horizontal transverse axis in the connecting region between the flexible sheetlike structure 6 and the contour part 7.

In an end region facing the rear region 3 of the motor vehicle, the guide rail arrangement 8 merges into a control slot 9 which drops obliquely downwards and continues in alignment with the guide rail arrangement. Said control slot 9 has the same free cross section as the associated guide rail arrangement 8, and therefore the guide slide 11 can be moved into the control slot 9 as far as the end stop thereof (not denoted specifically). Since the opposite control slots 9 are inclined relative to the horizontal guide rail arrangement 8 by an angle of between preferably 10° and 45°, during the transition from the guide rail arrangement 8 into the oblique control slot 9 the guide slide 11 moves obliquely rearwards and downwards such that each receiving support 12 of the guide slide 11 is tilted rearwards with respect to the rear region 3. By this means, the contour part 7 is shifted rearwards with respect to the rear region 3 by the angular amount passed through, wherein the flexible sheetlike structure 6 is also extended further rearwards at the same time by the additional extension distance. The tilting of the contour part 7 rearwards with respect to the rear region 3 therefore permits an additional extension distance of the sheetlike structure 6 such that the size of the contour part 7 extended in the longitudinal direction of the vehicle can be kept shorter than would be the case in a contour part which is not tilted obliquely rearwards.

Figure 2:
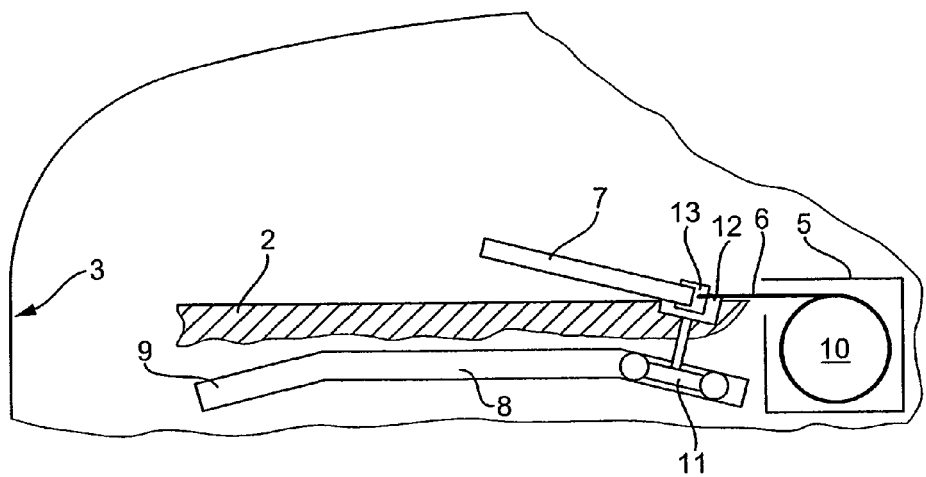
FIG. 2 shows, in an enlarged, highly schematized side view, the embodiment according to FIG. 1 with a contour part in a first functional position.
Figure 3:
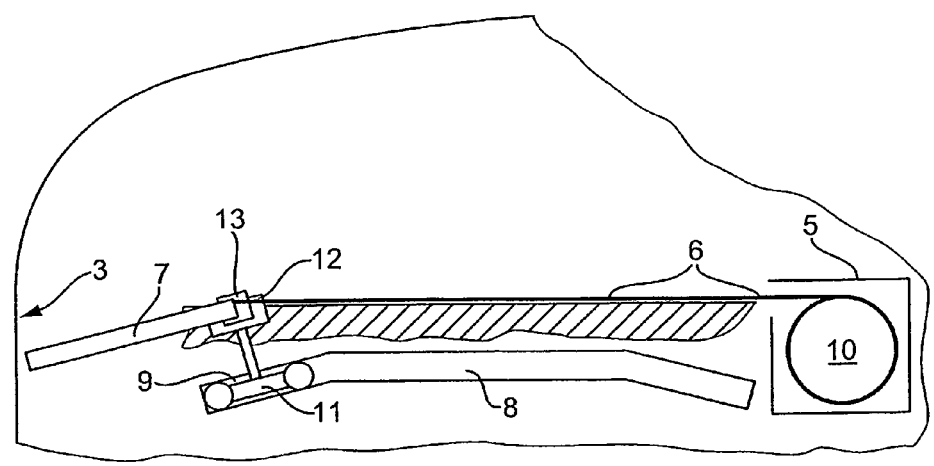
FIG. 3 shows the embodiment according to FIG. 2 with the contour part in an extended end position.
Figure 4:
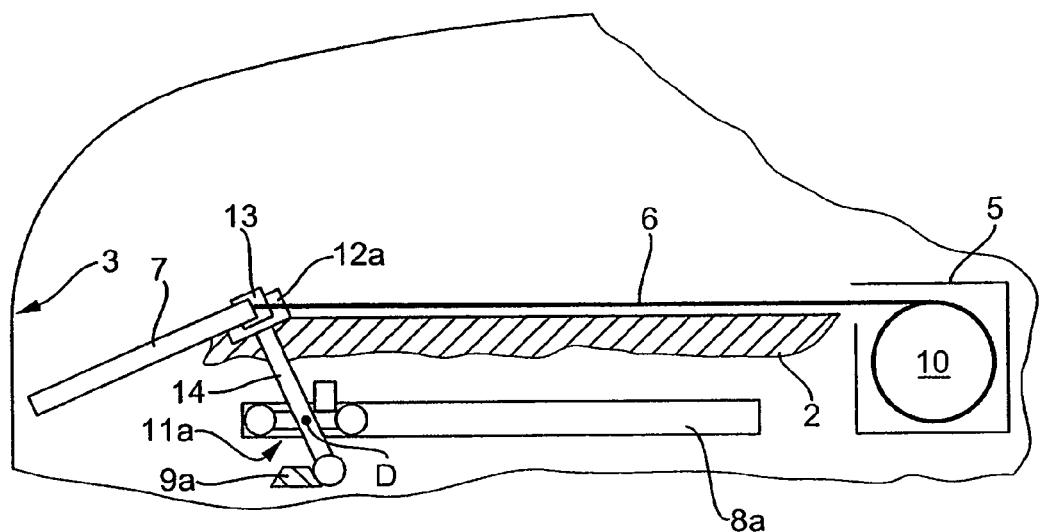
FIG. 4 shows, in a highly schematized side view, a further embodiment of a protection device according to the invention, wherein the contour part is in the extended end position thereof.
Figure 5:
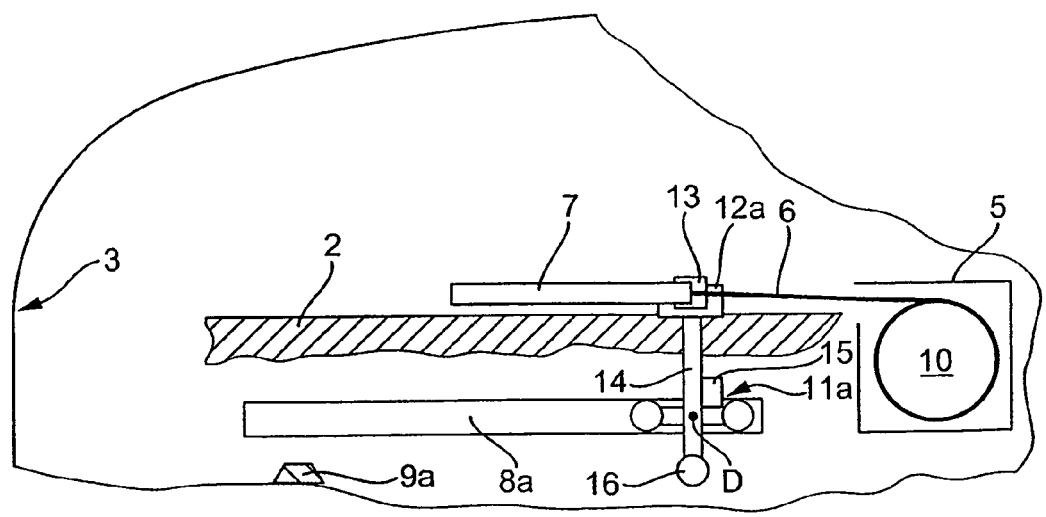
FIG. 5 shows the embodiment according to FIG. 4, in which the contour part is virtually in the retracted inoperative position.

The same function emerges in the embodiment according to FIGS. 4 and 5. Functionally identical components and sections are provided with identical reference numbers, some with the addition of the letter a. The essential difference in the embodiment according to FIGS. 4 and 5 is that the tilting of the contour part 7 shortly before reaching the extended end position is not carried out by means of a control slot 9 but rather by means of a pivoting arm 14 which is held on the guide slide 11a in a manner such that it can pivot about an axis of rotation D. The guide rail arrangement 8a itself is configured exclusively horizontally. To the extent that the embodiment according to FIGS. 4 and 5 is not described in detail below, reference is made to the description of the functionally identical parts and sections of the embodiment according to FIGS. 2 and 3.

The guide rail arrangement 8a extends horizontally at a distance below an extension plane of the flexible sheetlike structure 6, wherein each guide rail arrangement 8a is integrated in the corresponding loading space side wall 2. The retaining sections 13 of the contour part 7 are held in a form-fitting and rotationally fixed manner in a respective receiving support 12a of the guide slide 11a. However, in this embodiment, each receiving support 12a is held on the guide slide 11a by means of the pivoting arm 14. A supporting stop 15 retains the pivoting arm 14 together with a spring arrangement (not illustrated) in a vertical, upright orientation relative to the horizontal guide rail arrangement 8a. In an embodiment (not illustrated) of the invention, the supporting stop 15 is designed as a magnet at which the pivoting arm 14, which is of magnetizable design, is retained during an extension or return movement of the contour part 7.

The pivoting arm 14 has an extension arm section 16 which protrudes downwards over the axis of rotation D and comes to rest against a restraint stop 9a, which is mounted on the vehicle, shortly before the extended end position of the contour part 7 and of the sheetlike structure 6 is reached. During a further displacement movement of the guide slide 11a as far as the rear end region of the guide rail arrangement 8a, the extension arm section 16 therefore strikes against the restraint stop 9a and inevitably pivots the pivoting arm 14 obliquely rearwards. As a result, the desired tilting of the contour part 7 rearwards with respect to the rear region 13 occurs. During a return movement from said extended end position of the contour part 7, a return force, which is brought about by a spring motor, of the winding shaft 10 acts on the flexible sheetlike structure 6, as a result of which the contour part 7 is also drawn back. As soon as the contour part 7 has carried along the guide slide 11a to an extent such that the extension arm section 16 is removed from the restraint stop 9a, the pivoting arm 14 pivots back again into the upright starting position thereof such that it is moved forwards in the direction of the cassette housing 5.

Both embodiments according to FIGS. 2 to 5 can be extended manually towards the rear region 3. As an alternative, it is possible for the guide slide 11, 11a to be assigned a driving unit which carries out an extension movement and/or a return movement of the sheetlike structure 6. The driving unit can be designed or assisted in an electric, hydraulic, pneumatic or mechanical manner.

The invention claimed is:

1. A protection device for a vehicle interior comprising: a flexible sheetlike structure which is mounted movably between a compactly stored inoperative position and a fully extended end position and is provided at an end thereof which is in front of the flexible sheetlike structure in a movement direction of extension with a planar and dimensionally stable contour part which extends substantially over an entire width of the flexible sheetlike structure, wherein control means are located at a movement end region of the contour part shortly before the fully extended end position of the flexible sheetlike structure is reached, said control means shifting the contour part forward in the movement direction of extension of the flexible sheetlike structure by an additional extension distance.

2. The protection device according to claim 1, wherein the control means comprises control kinetics acting mechanically on the contour part and shifting the contour part the additional extension distance.

3. The protection device according to claim 2, wherein the control kinetics are configured in such a manner that the contour part is shifted the additional extension distance by a pivoting or curved movement.

4. The protection device according to claim 1, wherein the contour part is guided over an entire extension distance thereof via a guide which is on the vehicle and which includes the control means.

5. The protection device according to claim 4, wherein the contour part is held in regions of opposite ends thereof on a slide which is mounted movably in a guide rail arrangement on the vehicle.

6. The protection device according to claim 5, wherein the control means are located at an end region of the guide rail arrangement and comprise a control slot which is inclined relative to the guide rail arrangement in such a manner that the contour part is tilted forward in the extension direction upon reaching the control slot.

7. The protection device according to claim 5, wherein the contour part is held on the slide by a pivoting arm, the pivoting arm is mounted pivotably on the slide about a pivot axis extended transversely with respect to the extension direction, and a restraint is provided at an end region of the guide rail arrangement, said restraint transferring the pivoting arm when the slide reaches the end region into a pivoted position which is shifted forwards in the extension direction.

8. The protection device according to claim 4, wherein the contour part has opposite end regions accommodated in corresponding receptacles of respective slides in a form-fitting manner such that the contour part is positioned in a rotationally fixed manner in the receptacles.

9. A protection device for a vehicle interior comprising:
   a flexible sheetlike structure which is mounted movably between a compactly stored inoperative position and a fully extended position;
   a planar and dimensionally stable contour part disposed at an end of the flexible sheetlike structure and extending substantially over an entire width of the sheetlike structure; and
   a track system for moving the flexible sheetlike structure between the compactly stored inoperative position and the fully extended position, the track system forcing the contour part to shift forward an additional extension distance before the fully extended position is reached.

10. The protection device for a vehicle interior of claim 9, wherein:
   the track system forces the contour part to tilt as the contour part moves the additional extension distance.

11. The protection device for a vehicle interior of claim 10, wherein:
the track system includes a straight guide rail and an inclined slot inclined relative to the straight guide rail, the inclined slot forcing the contour part to tilt.

12. The protection device for a vehicle interior of claim 9, wherein:
a slide moves within the track system and the contour part is held on the slide by a pivoting arm;
the pivoting arm is mounted pivotably on the slide about a pivot axis; and
the track system includes a restraint abutting and pivoting the pivoting arm when the slide reaches an end region of the track system to thereby force the contour part to move the additional extension distance.

13. The protection device for a vehicle interior of claim 12, wherein:
the restraint forces the contour part to tilt as the contour part moves the additional extension distance.

14. A protection device for mounting within a vehicle interior, said protection device comprising:
a flexible sheet-shaped structure mounted for movement within the vehicle interior along a path of movement oriented in a direction corresponding to a longitudinal dimension of the vehicle, said flexible sheet-shaped structure being movable along the path of movement between a fully extended position adjacent a rear of the vehicle and a stored and inoperative position spaced longitudinally from the fully extended position, said flexible sheet-shaped structure having a first end fixed within the vehicle interior and a second end longitudinally spaced from said first end;
a dimensionally stable contour part connected to said second end of said flexible sheet-shaped structure and extending over substantially an entire width of said flexible sheet-shaped structure, said contour part being movable along with said flexible sheet-shaped structure between the inoperative position and the fully extended position; and
a guide arrangement mounted within the vehicle interior, said flexible sheet-shaped structure being supported on said guide arrangement for movement along the path of movement, said guide arrangement including a guide component disposed to act on said contour part during movement of same along the path of movement before said contour part is in the fully extended position to lengthen an extension distance of said flexible sheet-shaped structure and said contour part.

15. The protection device of claim 14, wherein said guide component is connected to said contour part and causes said contour part, before same is in the fully extended position, to assume an angled orientation relative to said flexible sheet-shaped structure, said contour part being disposed in the angled orientation relative to said flexible sheet-shaped structure in the fully extended position.

16. The protection device of claim 15, wherein said flexible sheet-shaped structure is oriented substantially horizontally in the fully extended position, and said contour part in the angled orientation angles downwardly as same projects rearwardly within the vehicle interior relative to said flexible sheet-shaped structure when in the fully extended position.

17. The protection device of claim 16, wherein said guide arrangement includes a pair of guide rails mounted on opposite sides of the vehicle interior and extending generally parallel to the longitudinal dimension thereof, said guide component being engaged with said guide rails for movement along the path of movement with said flexible sheet-shaped structure and said contour part.

18. The protection device of claim 14, wherein said guide arrangement includes a guide rail which defines the path of movement of said flexible sheet-shaped structure and said contour part, a first part of said guide rail being disposed substantially horizontally and defining a first part of the path of movement and a second part of said guide rail being disposed in an angular orientation transverse to said first part and adjacent a rear of the vehicle, a junction between said first and second parts of said guide rail being disposed longitudinally along the path of movement between the inoperative position and the fully extended position of the flexible sheet-shaped structure and said contour part, said guide component being engaged with said guide rail and connected to said contour part, and said guide component when engaged within said second part of said guide rail causing said contour part, before same is in the fully extended position, to assume an angled orientation relative to said flexible sheet-shaped structure.

19. The protection device of claim 14, wherein said guide arrangement includes a guide rail which defines the path of movement of said flexible sheet-shaped structure and said contour part, said guide component being engaged with said guide rail and connected to said contour part, said guide component including an arm mounted for pivoting movement, said guide arrangement including a stop disposed longitudinally along the path of movement between the inoperative position and the fully extended position of the flexible sheet-shaped structure and said contour part, said arm engaging said stop before said flexible sheet-shaped structure and said contour part are in the fully extended position and causing said contour part to assume an angled orientation relative to said flexible sheet-shaped structure.

* * * * *